Aug. 19, 1969  W. McCANDLESS  3,461,474
HOPPER FOR POWER SWEEPER
Filed Sept. 22, 1967  2 Sheets-Sheet 1
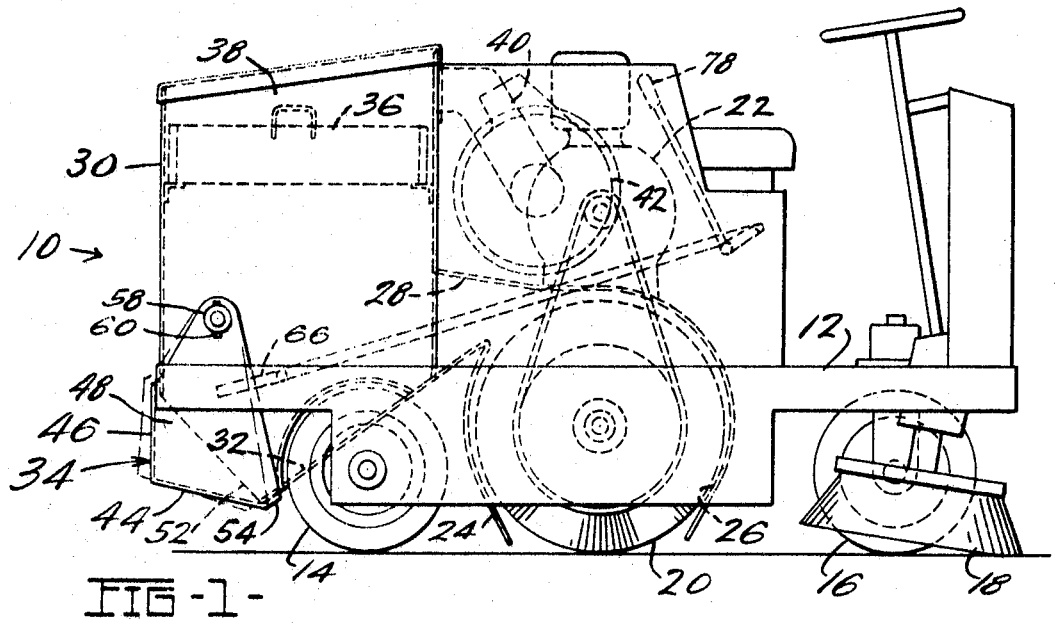
FIG-1-
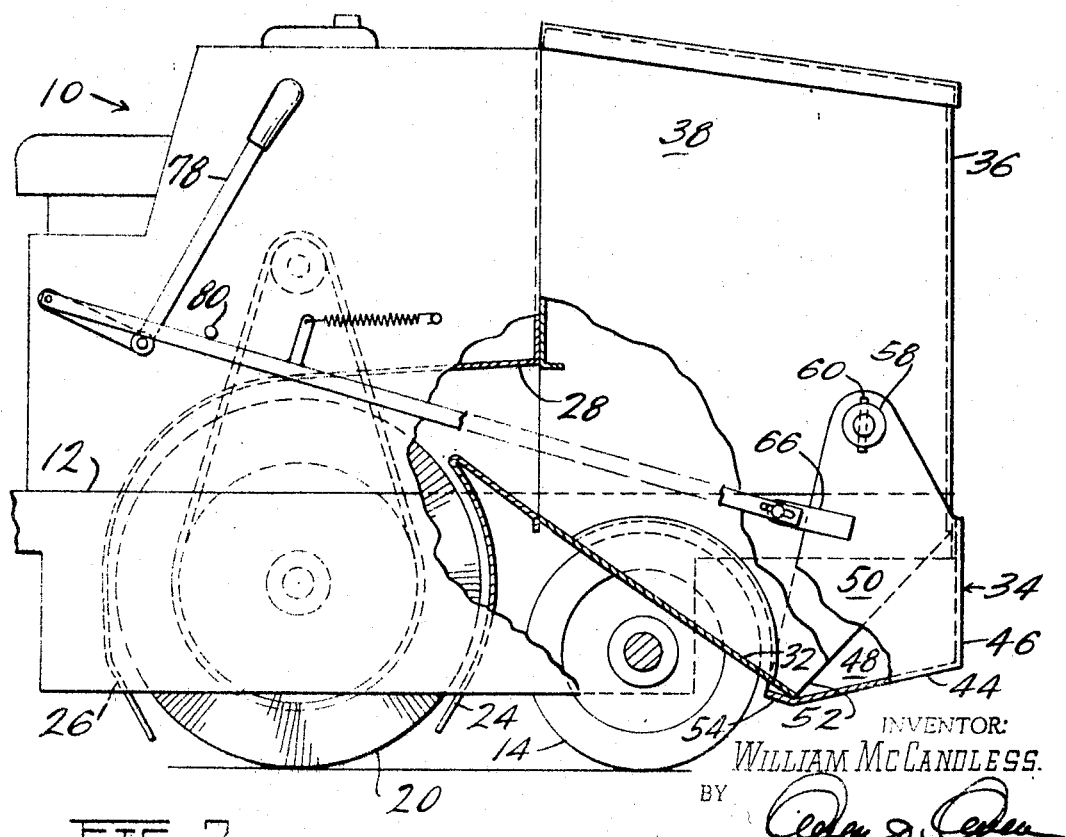
FIG-2-
INVENTOR:
WILLIAM McCANDLESS.
BY
ATT'YS.

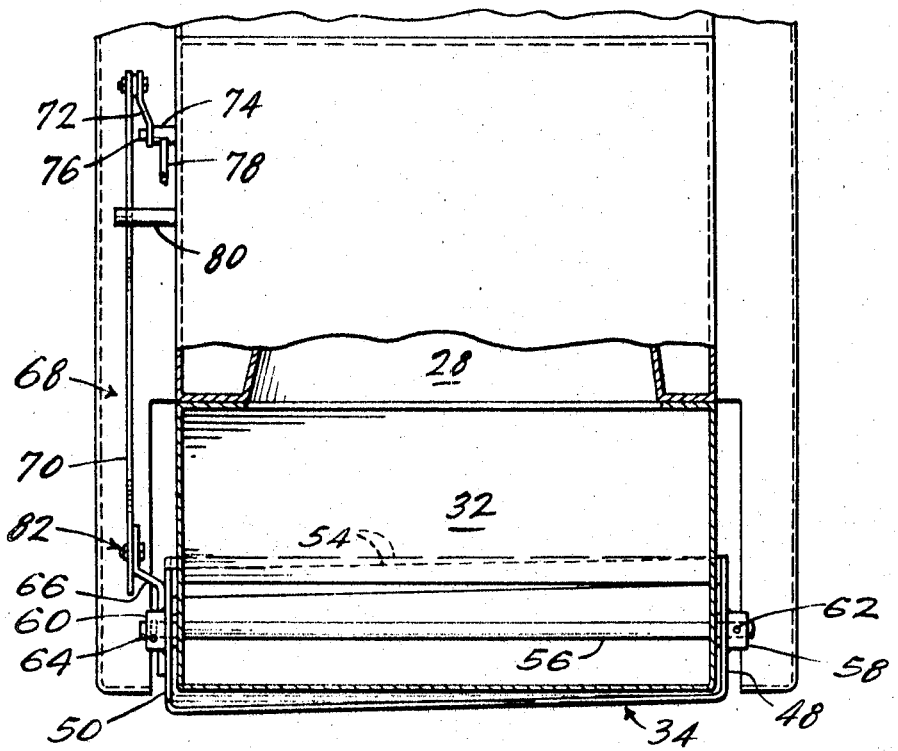
FIG-3-
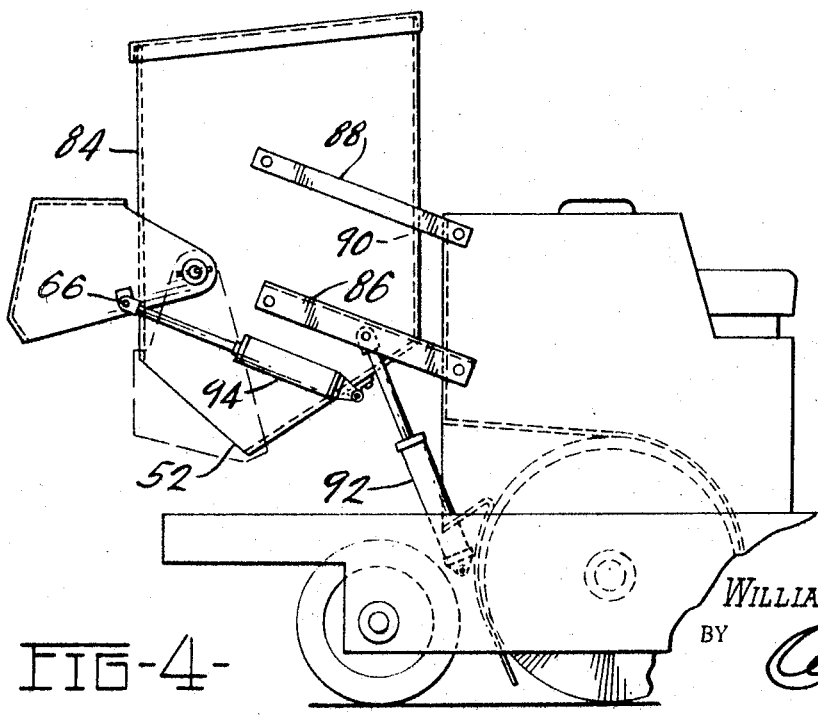
FIG-4-

United States Patent Office 3,461,474
Patented Aug. 19, 1969

3,461,474
HOPPER FOR POWER SWEEPER
William McCandless, Toledo, Ohio, assignor, by mesne assignments, to The Scott & Fetzer Company, Lakewood, Ohio, a corporation of Ohio
Filed Sept. 22, 1967, Ser. No. 669,747
Int. Cl. E01h 1/04; B60p 1/00
U.S. Cl. 15—83                                            10 Claims

ABSTRACT OF THE DISCLOSURE

A power sweeper has a hopper which can be emptied relatively easily with minimum mechanism. The dumping door for the hopper is located at the bottom rear portion thereof with the door actually constituting part of the bottom of the hopper. The door is pivotally mounted on the sweeper and is simply swung to a position to the rear of the hopper to enable the contents thereof to be emptied by gravity. If the hopper is to be emptied into an elevated receptacle, it can be raised by relatively simple parallel linkage and fluid-operated cylinder arrangement.

This invention relates to a hopper for a power sweeper and more particularly to such a sweeper hopper having improved means for emptying the contents thereof.

Power sweepers known in the art have employed a number of different arrangements for dumping the hoppers, with the hoppers being mounted on arms which raise and invert the hoppers, with the hoppers being mounted on various types of tracks to facilitate removing and dumping thereof, or with various cable arrangements for dumping the hoppers. All of these mechanisms and designs have been relatively complicated, whether the hoppers are front- or rear-mounted with respect to the main sweeping broom.

The present invention provides a power sweeper with a simple door arrangement for emptying the hopper, without moving the hopper itself at all. The door has side ears pivotally mounted on the sides of the hopper, with the door extending beneath an opening at the bottom of the hopper so that the door itself constitutes a portion of the hopper bottom. When it is desired to empty the hopper, the door is simply swung rearwardly, by manually-operated linkages, to enable all of the contents to be dumped. Consequently, no additional power drive or associated complicated mechanisms are needed, with the new arrangement being of inexpensive and simplified, maintenance-free design.

If desired, however, the hopper can be raised before being emptied by a parallel link arrangement powered by a fluid-operated cylinder. This is particularly advantageous if the contents are to be dumped into a walled container.

It is, therefore, a principal object of the invention to provide a simplified, inexpensive hopper door for emptying a hopper of a power sweeper.

Another object of the invention is to provide a hopper for a power sweeper which is raised and lowered by parallel linkages for dumping purposes.

Still another object of the invention is to provide a low-cost, relatively maintenance-free, power sweeper of compact design.

Many other objects and advantages of the invention will be apparent from the following detailed description of preferred embodiments thereof, reference being made to the accompanying drawings, in which:

FIG. 1 is a somewhat schematic side view in elevation of a power sweeper embodying the invention;

FIG. 2 is an enlarged, fragmentary side view in elevation of the opposite side of the sweeper, showing a dumping door for the hopper and mechanism for operating the door;

FIG. 3 is a top view of the hopper door and operating mechanism and further showing the manner in which the door is mounted on the hopper; and FIG. 4 is a schematic side view in elevation on a smaller scale of a modified sweeper in which the hopper can be elevated prior to dumping.

Referring to FIG. 1, a sweeper embodying the invention is indicated at 10 and includes a main frame 12 with wheels 14 and 16 for driving and steering the sweeper. A side broom 18 is mounted under a forward portion of the sweeper and a main broom 20 is rotatably supported under an intermediate part of the sweeper. As shown in FIG. 1, the main broom 20 is driven in a counterclockwise direction by a motor 22. The main broom 20 is located in an intermediate chamber as defined by a rear wall 24 and a forward wall 26 extending downwardly near the surface to be cleaned. A rearwardly-directed discharge opening or chute 28 is formed by the walls 24 and 26 through which dirt is directed from the broom. A hopper 30 at the rear of the sweeper 10 receives the dirt in a bottom portion thereof formed in part by a rearwardly slanted bottom wall 32 and a dumping door 34. Lighter dust and air move upwardly where the dust is collected by a filter 36 and the air is carried through a plenum chamber 38 to an inlet 40 of a blower 42 which also can be driven by the motor 22.

The dirt and dust collected in the bottom of the hopper 30 can readily be emptied by means of the dumping door 34. The door 34 includes a first or bottom panel 44 which also constitutes part of the bottom of the hopper 30, along with the bottom wall 32. In addition, the door includes a rear panel 46 which constitutes part of the rear wall of the hopper 30 and is located at an angle to the bottom panel 44. The door 34 also includes two side walls 48 and 50 which extend upwardly to form pivotal ears for the door. The lower portions of the side walls 48 and 50, as well as the rear panel 46 and the bottom panel 44, are effective to close off an opening 52 formed diagonally across the lower rear portion of the hopper 30. The bottom panel 44 further has a forwardly and upwardly extending lip 54 which extends forwardly of the opening 52 and under the bottom wall 32. The lip 54 aids in closing off the opening 52 and substantially prevents the seepage of dust from any crack between the panel 44 and the bottom wall 32. However, the door need not form an air-tight seal since the hopper 30 is under suction by virtue of the arrangement of the blower 42, thereby relieving the requirement of full seals to prevent escape of air-borne dirt.

The door 34 and specifically the side walls 48 and 50 are pivotally supported directly through side walls of the hopper 30 by a pivot bar 56 extending thereacross. The bar is pivotally mounted in the side walls and is rigidly affixed to the door side walls 48 and 50 by extension blocks 58 and 60 through which pins 62 and 64 extend. Actually, the holes in the bar 56 for the pins are not parallel but are slightly arcuately offset so that the bar 56 must be placed in torsion when being assembled with the door 34 to align the bar openings with the openings in the blocks 58 and 60, which are parallel. When the torsion on the bar is released, the door tends to assume a slightly twisted position (FIG. 3) so that the end portion of the door adjacent the side wall 48 closes slightly before the opposite end to which the opening and closing mechanism is connected. This assures that all portions of the door are fully closed when the operating mechanism is moved into the closed position, as will be subsequently apparent.

For the purpose of opening and closing the door, the side wall 50 has an arm 66 extending forwardly therefrom, as shown in FIGS. 1 and 3. The mechanism for operating the door comprises an over-center door linkage indicated generally at 68. This linkage includes a connecting link 70 pivoted to an outer end of an arm 72 which is pivotally supported on a cylinder 74 by a stud shaft 76 through the sweeper body. An operating lever 78 extends upwardly from the cylinder 74 and is functionally integral with the arm 72. When the lever 78 is moved in a counterclockwise direction, as shown in FIG. 2, it moves the arm 72 in the same direction and forces the linkage 70 rearwardly. This causes the door 34 to swing to the open position, as shown in dotted lines.

Since the bottom panel 44 of the door is at the lowest point of the hopper, most of the dirt is collected thereon or thereabove so when the door is pened, this dirt is readily emptied from the hopper. Dirt on the slanted bottom wall 32 then slides through the opening 52 with the sweeper moved back and forth slightly, if desired, to facilitate the sliding movement of the dirt out of the opening. The dirt lying on the bottom panel 44 tends to move the door 34 toward the open position initially, which facilitates operation of the lever 78 by the operator.

When the hopper is emptied, the lever 78 is moved in a clockwise direction until the link 70 moves above an over-center position and hits a stop 80. Because of the slightly twisted position of the door with the leading edge or lip portion 54 at the right end, as shown in FIG. 3, being forwardly of an unstressed position, as indicated in dotted lines, this end of the door first contacts the hopper adjacent the opening 52 to assure that the door will be closed upon further action of the linkage 68 on the arms 66. The link 70 is then under tension as the door is further closed and the door remains firmly closed without any possibility of rattling when the lever 78 is in the over-center position. A spring 81 can be used in addition to hold the linkage 68 in the over-center position, if desired. The link 70 and the arm 66 have a slot and bolt arrangement indicated at 82 to achieve proper adjustment of the links so that the desired result is achieved.

It will be seen from the above that the emptying mechanism for the hopper 30 is of a simple yet effective and low-cost design. In the event that the hopper 30 is to be raised in order to dump its contents into a container having a front wall above the floor level, the mechanism shown in FIG. 4 can be employed. In this instance, a hopper 84 is designed to be separate from the main body of the sweeper and is connected thereto by a pair of parallel links 86 and 88. The links are connected at their opposite ends to the hopper and the sweeper body respectively and are positioned such that when the hopper is in its lower position, bearing against the sweeper body, an inlet opening 90 thereof is aligned with the chute 28 communicating with the main broom. A fluid or pneumatic cylinder 92 can be employed on either or both sides of the sweeper, as needed, with the lower end pivotally connected to the sweeper frame and the upper end connected to an intermediate portion of the lower link 86, in this instance. When the hopper is in the raised position, as shown in dotted lines, a smaller cylinder 94 connected to the door arm 66 can be actuated to open and close the door.

I claim:

1. In a power sweeper for sweeping a large surface, a main frame, wheel means rotatably mounted on said frame for driving and steering said sweeper, a main broom rotatably held by said frame, a dirt-receiving hopper at the rear of the sweeper for receiving dirt from said broom, said hopper including side walls, a rear wall, a front wall having an opening through which the dirt is received, and a dumping opening at the bottom thereof, a dumping door pivotally supported by said hopper, said dumping door having a first position covering said dumping opening and being located at least partially below said hopper, said dumping door having a second position substantially clear of said hopper, remote control means connected to said dumping door for moving said door between the first and the second positions, said remote control means being connected to said door near one end thereof, and said door being designed so that the end opposite said control means contacts the hopper adjacent the dumping opening before the end to which the control means is connected.

2. A power sweeper according to claim 1 characterized by said remote control means including an overcenter linkage movable to an over-center position to hold the door closed, when in the first position.

3. A power sweeper according to claim 1 characterized further by the edge of the door below the dumping opening having a lip slanted upwardly away from the door and extending beyond the dumping opening when the door is in its first position.

4. A power sweeper according to claim 1 wherein at least part of the door located below the dumping opening is forward of the pivot support thereof whereby dirt collected in said hopper and lying on said forward portion of said door tends to urge the door toward the second position.

5. A power sweeper according to claim 1 characterized further by said hopper having a bottom wall sloping toward said dumping opening.

6. A power sweeper according to claim 1 characterized further by said power sweeper being of a riding type and having a seat for an operator, and said remote control means connected to said door extends to a point near the seat whereby the operator can move the door to the second position from the seat.

7. A power sweeper according to claim 1 characterized further by means connected to said hopper and to said frame for raising the entire hopper in a generally vertical direction, prior to moving said door from said first position to said second position.

8. A power sweeper according to claim 7 characterized further by said connected means includes a pair of parallel links on each side of said hopper with ends pivotally connected to said hopper and other ends pivotally connected to said sweeper, and means for raising and lowering said hopper with said arms moving in pivotal paths.

9. A power sweeper according to claim 8 characterized by said last-named means comprising a fluid-operated cylinder connected to at least one of said arms.

10. A power sweeper for sweeping a large surface comprising a main frame, wheel means rotatably mounted on said frame for driving and steering said sweeper, a main broom rotatably held by said frame, a dirt-receiving hopper at the rear of said sweeper for receiving dirt from said broom, said hopper including side walls, a rear wall, a front wall having an opening through which the dirt is received, and a dumping opening at the bottom thereof, a dumping door pivotally supported by said hopper, said dumping door having a first position covering said dumping opening and being located at least partially below said hopper, said dumping door having a second position substantially clear of said hopper, pivot means connecting said dumping door to said side walls of said hopper, a seat for an operator remote from said dumping door, a first arm pivotally connected to said dumping door below said connecting means adjacent one of said hopper side walls and extending forwardly toward said operator's seat, a second arm pivotally connected to the forward end of said first arm and extending rearwardly therefrom, a stub shaft pivotally supporting the rear end of said second arm from the sweeper body and integrally attached to the rear end of said second arm, stop means limiting upward movement of said first arm, and an operating lever integrally attached to and extending upwardly from said stub shaft adjacent the operator's seat whereby said arms and said lever form an over-center connection for holding said hopper door closed when said lever is in a rear position.

References Cited

UNITED STATES PATENTS

| | | | |
|---|---|---|---|
| 896,616 | 8/1908 | Briggs | 298—30 |
| 1,239,293 | 9/1917 | Murphy | 15—84 |
| 2,162,353 | 6/1939 | McVicker | 298—27 |
| 2,505,199 | 4/1950 | Mott | 15—85 |
| 2,614,279 | 10/1952 | Mott | 15—83 |
| 2,800,363 | 7/1957 | Gilpatrick | 298—30 |
| 2,888,885 | 6/1959 | Dorey | 298—30 X |
| 3,354,489 | 11/1967 | Ehrlich | 15—83 |

EDWARD L. ROBERTS, Primary Examiner

U.S. Cl. X.R.

214—63; 298—30